United States Patent
Tian et al.

(10) Patent No.: US 11,949,251 B2
(45) Date of Patent: Apr. 2, 2024

(54) WIRELESS CHARGING COIL IN WEARABLE DEVICES

(71) Applicant: Google LLC, Mountain View, CA (US)

(72) Inventors: Qi Tian, San Jose, CA (US); Liang Jia, Palo Alto, CA (US); Tressa Christie Scott, San Francisco, CA (US); Srikanth Lakshmikanthan, Milpitas, CA (US)

(73) Assignee: Google LLC, Mountain View, CA (US)

( * ) Notice: Subject to any disclaimer, the term of this patent is extended or adjusted under 35 U.S.C. 154(b) by 383 days.

(21) Appl. No.: 17/065,595

(22) Filed: Oct. 8, 2020

(65) Prior Publication Data

US 2022/0115918 A1  Apr. 14, 2022

(51) Int. Cl.
| | |
|---|---|
| *H02J 7/00* | (2006.01) |
| *H02J 7/02* | (2016.01) |
| *H02J 50/10* | (2016.01) |
| *H02J 50/70* | (2016.01) |

(52) U.S. Cl.
CPC ............... *H02J 50/70* (2016.02); *H02J 7/02* (2013.01); *H02J 50/10* (2016.02)

(58) Field of Classification Search
USPC .............. 320/106, 107, 108, 109, 110, 114
See application file for complete search history.

(56) References Cited

U.S. PATENT DOCUMENTS

| | | | |
|---|---|---|---|
| 8,928,276 B2 * | 1/2015 | Kesler | H01F 38/14 320/108 |
| 9,583,256 B2 | 2/2017 | Lapetina et al. | |
| 2015/0364938 A1 * | 12/2015 | Lapetina | H01F 27/36 320/114 |
| 2015/0371768 A1 * | 12/2015 | Graham | H02J 7/0044 320/108 |
| 2019/0393730 A1 | 12/2019 | Wittenberg et al. | |
| 2022/0279687 A1 * | 9/2022 | Lee | B32B 37/18 |

FOREIGN PATENT DOCUMENTS

WO   WO-2016126918 A1 *  8/2016 ........... A61B 5/0031

* cited by examiner

*Primary Examiner* — Brian Ngo
(74) *Attorney, Agent, or Firm* — Lerner David LLP

(57) ABSTRACT

The present disclosure provides for a wearable device having a wireless power receiving system that may inductively receive or transmit power. The wireless power receiving system includes a receiver coil having a profile that follows a contour of a bottom cover of the wearable device. A transmitter coil from a wireless charging device has a complementary profile that mates with the profile defined by the receiver coil. In one example, the wireless power receiving system includes a shielding, and a receiver coil attached to the shielding. The receiver coil further includes an inner wall and an outer wall connected by a top surface of a coil body. The inner wall defines a center opening in the receiver coil, wherein the receiver coil is conical in shape.

9 Claims, 15 Drawing Sheets

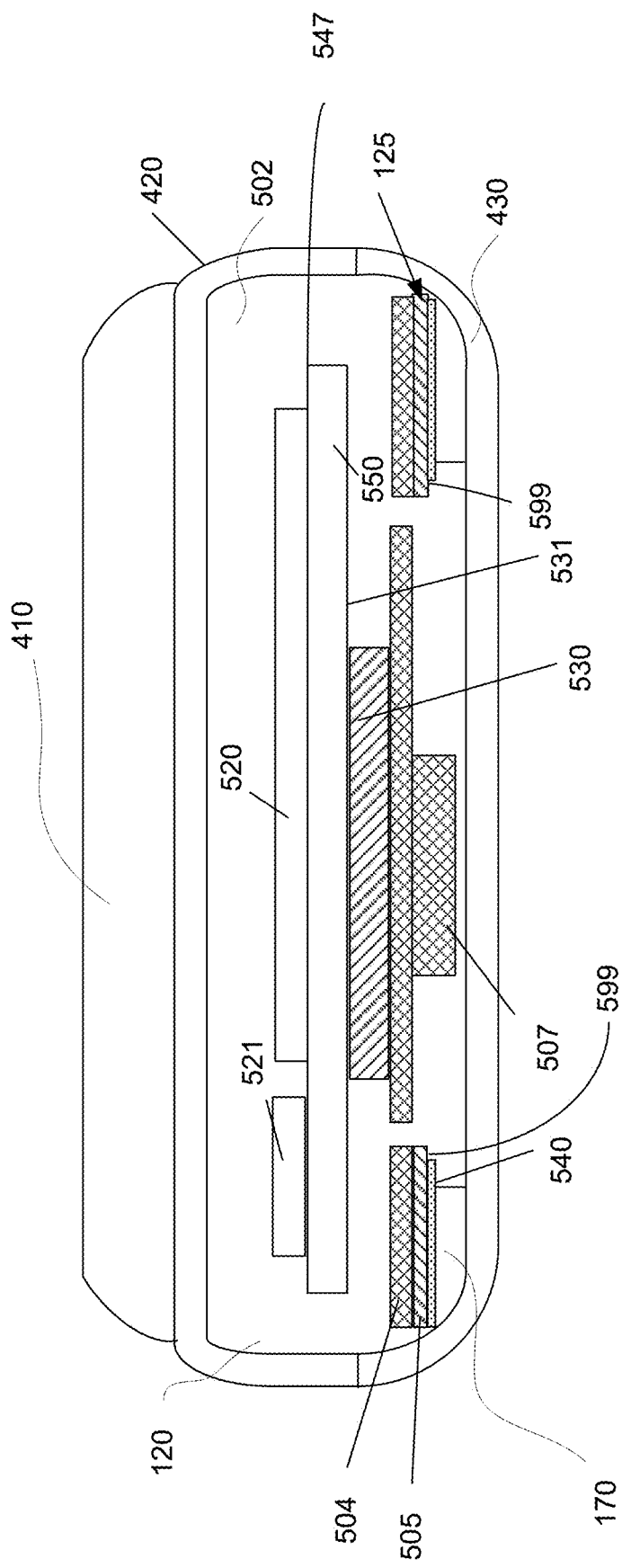
FIGURE 5
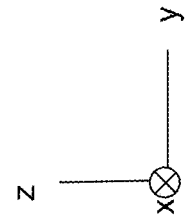

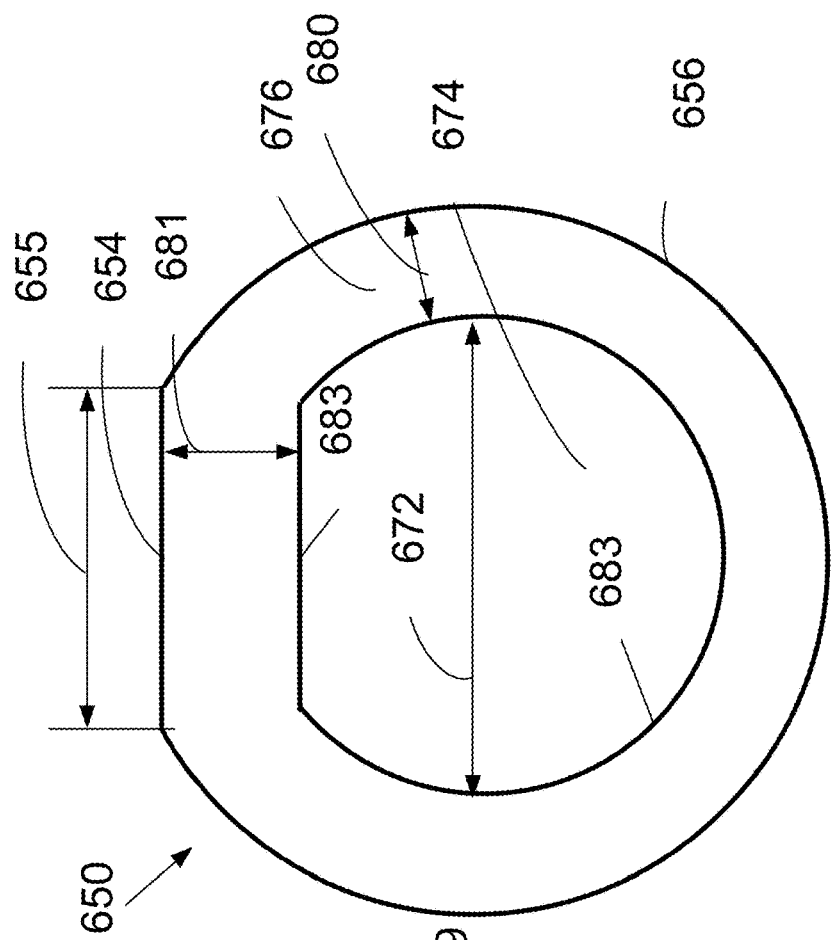
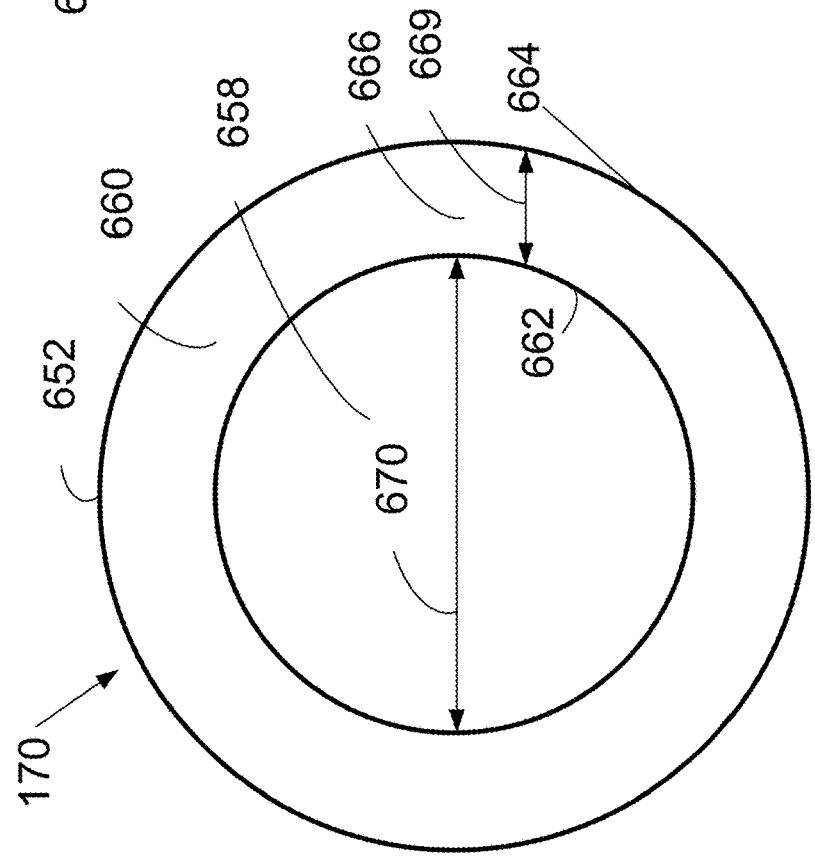
FIGURE 6B
FIGURE 6A

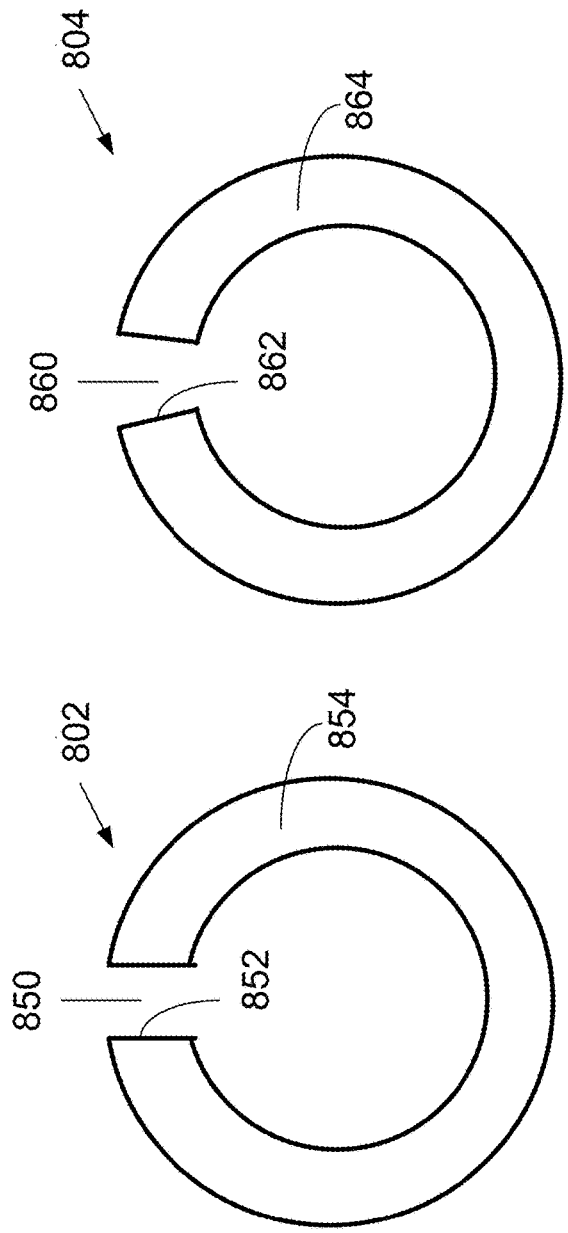
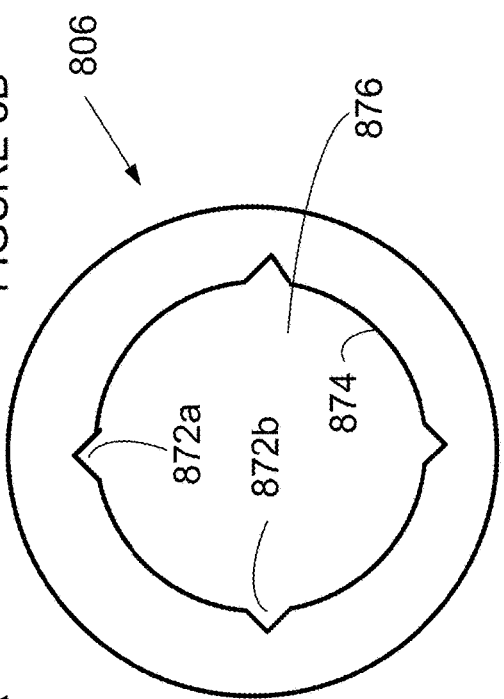
FIGURE 8A
FIGURE 8B
FIGURE 8C

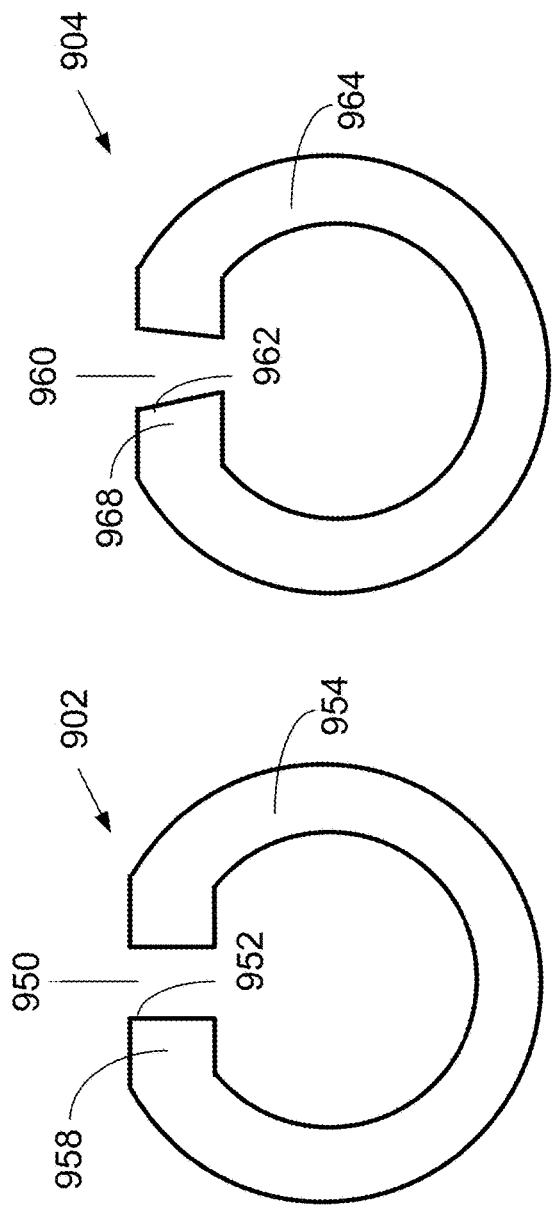
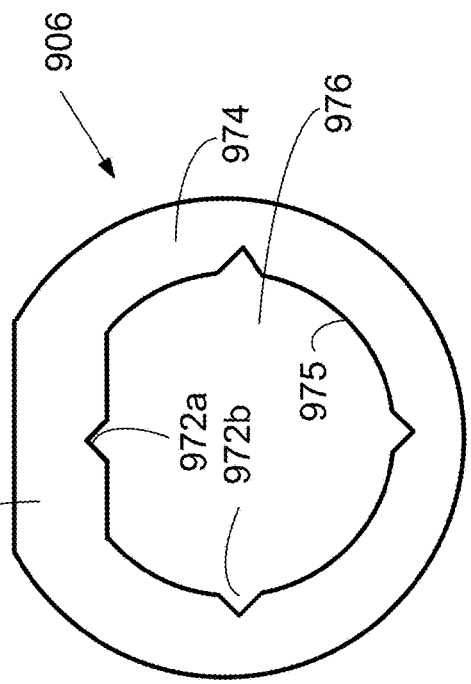
FIGURE 9A
FIGURE 9B
FIGURE 9C

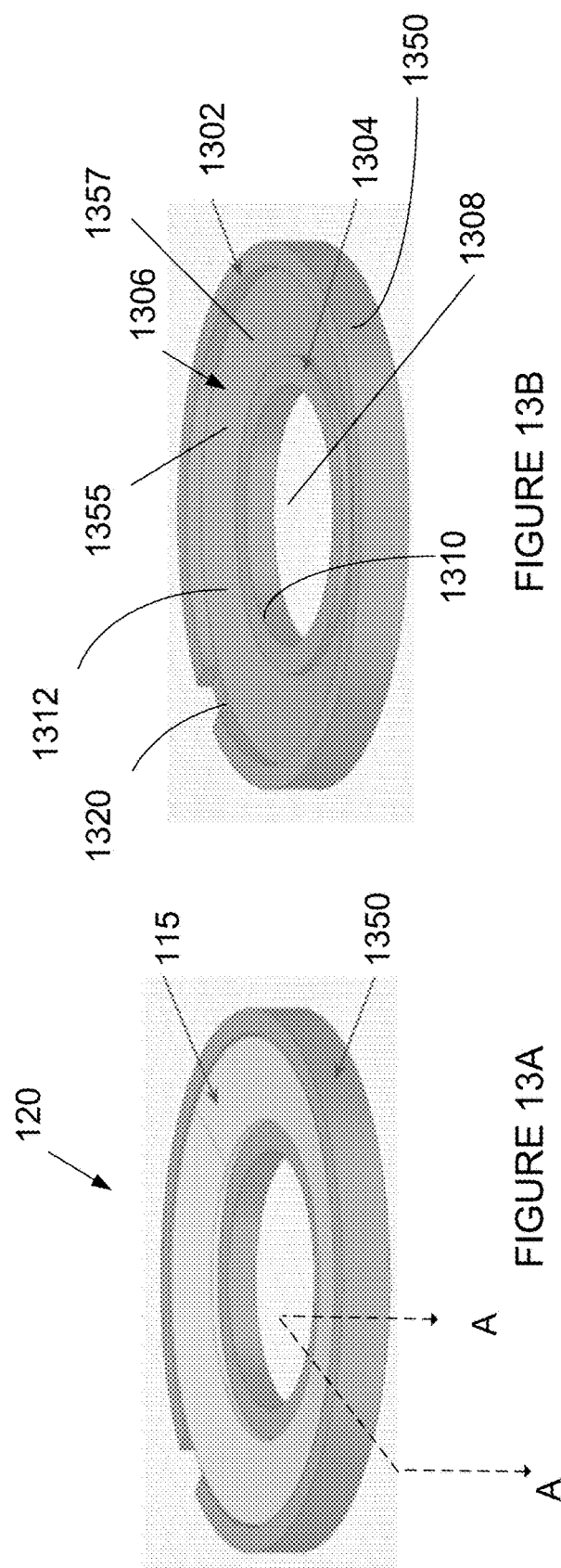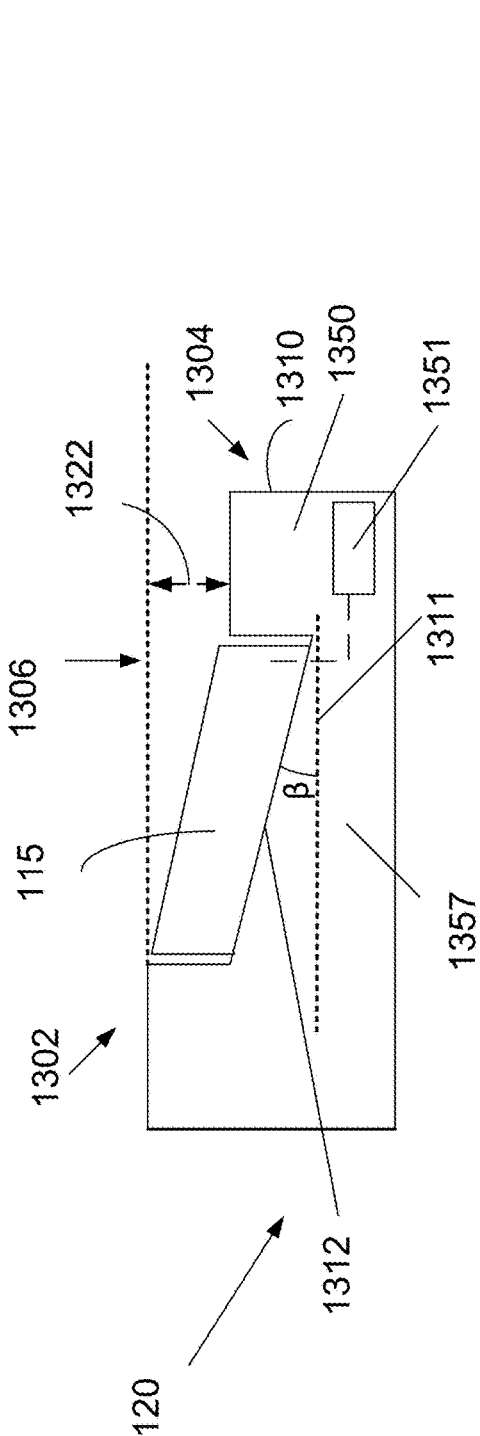
FIGURE 13A
FIGURE 13B
FIGURE 13C

WIRELESS CHARGING COIL IN WEARABLE DEVICES

BACKGROUND

Wearable devices, such as smartwatches and smart glasses, may provide many similar functions as other personal computing devices. Due to their proximity to the wearer, some wearable devices may provide additional functions not ordinarily provided by traditional computing devices, such as heart rate and body temperature monitors. Some wearable devices utilize a rechargeable battery that can be recharged by electrically coupling the wearable devices to a power source, such as a wireless charger. A receiver coil assembly is often utilized in the wearable device to receive power from a wireless charger without the need for a charging cord from the wearable devices. For example, some wearable devices can be recharged by resting the wearable devices on a charging surface of the wireless charger. A transmitter coil disposed below the charging surface may produce a time-varying magnetic field that induces a current/voltage in a corresponding receiver coil in the receiver coil assembly in the wearable device. Thus, maintaining a close proximity of the receiving coils from the wearable device to the transmitter coil from the wireless charger often enhances the charging efficiency.

However, due to the size limitation of the wearable devices, in some situations, the wearable devices are required to be placed in a relatively confined area from the charging surface of the wireless charger for efficient power receiving. Inaccurate placement or misalignment of the wearable devices on the wireless charger often results in poor charging efficiency or waste of power charging. Furthermore, the receiver coil along with a large number of electronic components are required to be positioned in a compact housing. In the example wherein the receiver coil is implemented at a location relatively far away from a bottom surface of the housing, the relatively long distance and/or the large gap from the receiver coil to the transmitter coil of the wireless charger also result in low charging efficiency.

SUMMARY

The present disclosure provides for a wearable device having a wireless power receiving system that may inductively receive or transmit power, such as electromagnetic energy via magnetic field, from a wireless charging device. In one example, the wireless power receiving system includes a shielding, and a receiver coil attached to the shielding. The receiver coil further includes an inner wall and an outer wall connected by a top surface of a coil body. The inner wall defines a center opening in the receiver coil, wherein the receiver coil is conical in shape.

In some examples, an adhesive layer is disposed between the shielding and the receiver coil. The shielding has a bottom exposed surface free from contact with the receiver coil. The receiver coil has a side linear portion connected to an annular portion. The receiver coil comprises several windings of an electrical conductor.

In some examples, the wireless power receiving system includes a release film, and an adhesive layer disposed between the release film and the shielding. The shielding has a side linear portion connected to an annular portion. The shielding comprises a cut-out portion. In one example, the cut-out portion is formed in the side linear portion. In another example, the cut-out portion is formed at an inner wall of the shielding.

Another aspect of the present disclosure includes a wireless power transfer system. The wireless power transfer system includes a wireless power receiving system, and a wireless charging device. The wireless charging device includes a transmitter coil having a conical shape, and a charging base. The charging base has a channel formed therein configured to receive the transmitter coil. The channel has a sloped surface configured to mate with the conical shape of the transmitter coil.

In some examples, the wireless power receiving system is disposed in a wearable device. A receiver coil is disposed in the wireless power receiving system. The receiver coil has a profile that follows a profile of an interior surface of a bottom cover of the wearable device. In one example, the receiver coil has a conical shape.

In some examples, the charging base includes an inner flange, an outer flange, and a supporting bottom connected between the inner flange and the outer flange, wherein the channel is defined on the support bottom between the inner flange and the outer flange. The outer flange has a height greater than a height of the inner flange. The transmitter coil has several windings of an electrical conductor.

Another aspect of the present disclosure includes a wireless charging device including a transmitter coil having a conical shape and a charging base. The charging base has a channel formed therein configured to receive the transmitter coil. The channel has a sloped surface configured to mate with the conical shape of the transmitter coil.

In some examples, the charging base includes an inner flange, an outer flange, and a supporting bottom connected between the inner flange and the outer flange. The channel is defined on the support bottom between the inner flange and the outer flange. The transmitter coil is removable from the charging base.

BRIEF DESCRIPTION OF THE DRAWINGS

FIG. 5 depicts a cross sectional view of an example smartwatch in accordance with aspects of the disclosure.

FIG. 6A-6B depicts a top view of different examples of a receiver coil in accordance with aspects of the disclosure.

FIG. 8A-8C depict top views of different examples of shielding in a wireless power receiving system in accordance with aspects of the disclosure.

FIG. 9A-9E depict top views of different examples of shielding in a wireless power receiving system in accordance with aspects of the disclosure.

FIG. 13A-13C depict perspective and a side view of a wireless charging device in accordance with aspects of the disclosure.

DETAILED DESCRIPTION

The present disclosure provides for a wearable device having a wireless power receiving system that may inductively receive or transmit power, such as electromagnetic energy via magnetic field, from a wireless charging device. The wireless power receiving system and the wireless charging device are collectively referred to herein as a wireless power transfer system. In one example, the wireless power receiving system includes a receiver coil having a profile that follows a contour of a bottom cover of the wearable device. For example, the receiver coil may have a cured, angled, sloped or conical profile that may fit the contour of an interior surface of the bottom cover of the wearable device. Accordingly, a gap between the receiver coil to the bottom cover of the wearable device is minimized so that a distance from the receiver coil to a transmitter coil from wireless charging device may also be reduced to enhance a charging coupling coefficient and charging efficiency.

Figure 1:
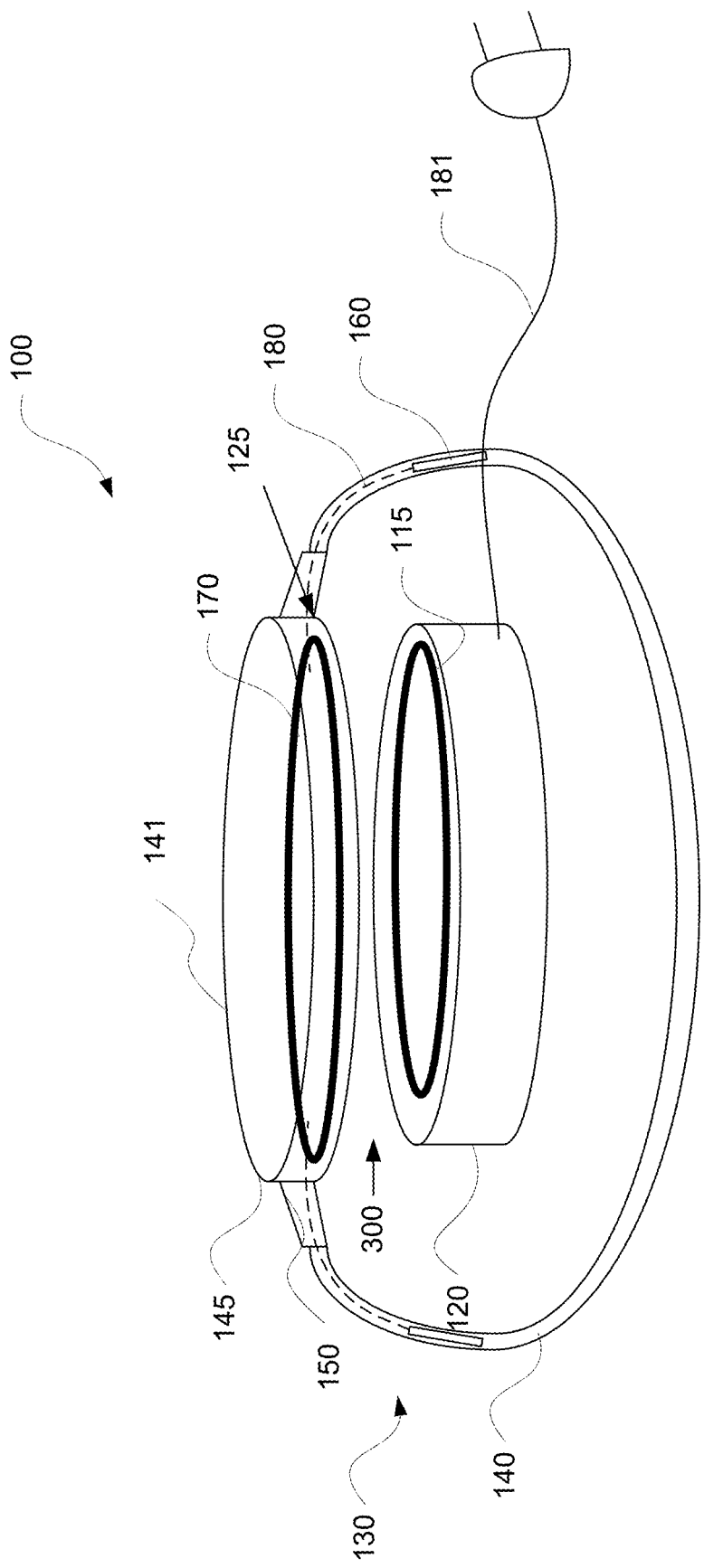
FIG. 1 depicts an example smartwatch with a wireless power receiving system and a wires charging device in accordance with aspects of the disclosure.

FIG. 1 illustrates an example wearable device. In this example, the wearable device is a smartwatch 100. However, it should be understood that the wearable device may be any of a variety of wearable devices, such as pendants, head-mounted displays, such as smart glasses, smart helmets, earbuds, or any of a variety of other devices.

The smartwatch 100 includes a watch body 145. While in the example shown the watch body 145 is round in shape, the watch body 145 may be any shape, such as rectangular, square, oval, polygon, arbitrary shape, etc. The watch body 145 has a housing 141 that can be made from a variety of materials, such as metal, plastic, glass, ceramics, or any combination of these or other material. The watch body 145 may contain a wireless power receiving system 125 including a receiver coil 170 configured to wirelessly receive power. Details of the structures and elements of the wireless receiving system 125 will be described below with reference to FIGS. 7A-7C. A number of electronic and/or mechanical components may also be included in the watch body 145. The electronic and/or mechanical components may include user input such as microphone, camera, touch screen; output devices such as display, speaker, haptics; one or more processors, memory, one or more sensors, clocks, etc.

The receiver coil 170 from the wireless power receiving system 125 may wirelessly receive and/or transmit power. For example, the receiver coil 170 may be configured to receive power inductively from a transmitter coil 115 in a wireless charging device 120. The wireless charging device 120 may include a power cord 181 that may be connected to a power source, such as a power outlet, to provide power signal, such as AC or DC power signals, to the wireless charging device 120. The receiver coil 170 may further be configured to supply power to components inside the watch body 145, including one or more energy storages, such as rechargeable batteries. For example, electrical connections may be provided between the receiver coil 170 and components inside the watch body 145. The receiver coil 170 may also be configured to inductively supply power to other components of the smartwatch 100, such as components in or on accessories of the smartwatch 100.

The smartwatch 100 may include one or more accessories, such as a watch band 130. In other examples where the wearable device 100 is a different device, the body of the device may have a different type of accessory. For example, a pendant may include an accessory such as a necklace. The watch band 130 may be made from a variety of materials, such as metal, rubber, nylon, cotton, plastic, glass, ceramics, or any combination of these or other material. The watch band 130 may be adapted to be worn around a person's wrist. For example, the watch band 130 includes a strap 140. The strap 140 may be adjusted to provide a secure and comfortable fit around the wrist of the wearer. In other examples, the watch band may be a bracelet, such as for a looser fit, or another type of attachment mechanism.

The watch band 130 may further include a receptacle 150 adapted to secure the watch body 145 of the smartwatch 100 to the watch band 130. For example, to accommodate the watch body 145, the receptacle 150 may have a similar shape as the watch body 145. Further, the receptacle 150 may include features such as grooves, hooks, locks, screws, pins, magnets, etc., which may interlock with features of the watch body 145 to ensure secure attachment. Although receptacle 150 is shown in this example, in other examples, the watch band 130 may include other mechanical features such as pins, screws, hooks, locks, etc. that secure the watch band 130 directly to the watch body 145.

In some examples, the watch band 130 may be configured to contain electronic and/or mechanical components. For example, electronic components 160 are shown positioned inside the strap 140. Alternatively or additionally, these electronic components may be positioned inside the receptacle 150. The electronic components 160 may include wireless communication systems for transferring and/or receiving data from components in the watch body 145, and from/to other devices. The electronic components 160 may further include identification and/or authentication devices, such as a Radio Frequency Identification (RFID) devices, which may be linked to a user profile or account. For example, the user profile or account may include information such as user preferences and other user data. In some examples, the electronic components 160 may also receive power from the receiver coil 170 through electrical connections 180. In some examples, to avoid making the watch band 130 bulky or heavy for the wearer, the electronic components 160 may be placed in the watch body 145 rather than in the watch band 130.

Wireless charging capabilities may improve water-proof or water-resistant features of the smartwatch 100. For example, since the watch body 145 may include wireless charging and/or communication capabilities, electrical connections such as wires or contact pins may not be needed in the watch body 145 and/or in the watch band 130. As such, the electronic components and the receiver coil 170 of the watch body 145 may not be exposed to contaminants such as dirt or water through exposed wires or contact pins, thus extending the service lifetime of the smartwatch 100 as well as the wireless charging efficiency.

Figure 2:
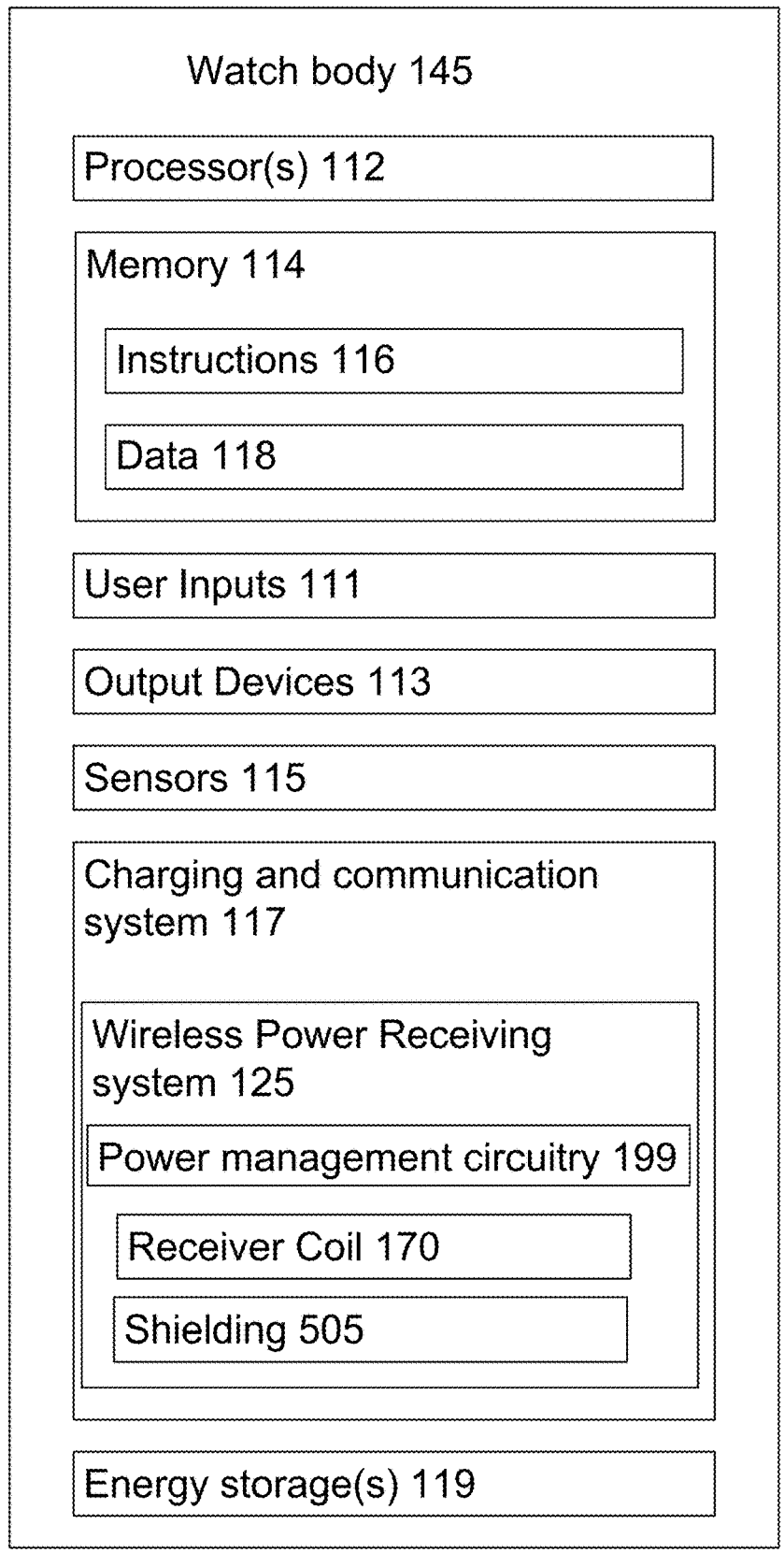
FIG. 2 depicts an example functional block diagram of an example smartwatch in accordance with aspects of the disclosure.

FIG. 2 is a block diagram of an example of the watch body 145 in the smartwatch 100 that includes the wireless power receiving system 125 in accordance with aspects of the disclosure. It should not be considered as limiting the scope of the disclosure or usefulness of the features described herein. In the example as shown, the watch body 145 may contain one or more processors 112, memory 114 and other components typically present in general purpose computing devices.

Memories 114 may store information accessible by the one or more processors 112, including instructions 116, that can be executed by the one or more processors 112. Memories 114 can also include data 118 that can be retrieved, manipulated or stored by the processors 112.

Further as shown in FIG. 2, the watch body 145 may include one or more user inputs, such as user inputs 111. For example, user inputs may include mechanical actuators, soft actuators, periphery devices, sensors, and/or other components. Users may be able to interact with the smartwatch 100 using the user inputs 111, such as opening a webpage or an email, writing a message, controlling display or audio functionalities, controlling sensors to monitor heart rate or body temperature, locating by GPS, etc.

The watch body 145 may include one or more output devices, such as output devices 113. For example, output devices may include one or more speakers, transducers or other audio outputs, a user display, a haptic interface or other tactile feedback that provides non-visual and non-audible information to the user. For example, a display in output devices 113 may display visual information to the user, such as texts, graphics, videos, etc. As another example, speakers in output devices 113 may be used to play music, emit audio for navigational or other guidance, for multimedia files, for voice calls, for translated speech, etc. Further, haptic or tactile feedback in the output devices 113 may be used to generate non-visual and non-audible alerts, such as by vibration.

The watch body 145 may include one or more sensors, such as sensors 115. For example, sensors may include a visual sensor, an audio sensor, a touch sensor, etc. Sensors may also include motion sensors, such as an Inertial Measurement unit ("IMU"). According to some examples, the IMU may include an accelerometer, such as a 3-axis accelerometer, and a gyroscope, such as a 3-axis gyroscope. The sensors may further include a barometer, a vibration sensor, a heat sensor, a radio frequency (RF) sensor, a magnetometer, a barometric pressure sensor, a heart rate sensor, a body temperature sensor. Additional or different sensors may also be employed. In some examples, sensors 135 may include sensors for detecting a battery state, a presence of a wireless charging device, or any of a variety of other conditions.

Watch body 145 may include a charging and communication system 117. The charging and communication system 117 may enable exchange of power and information with other devices. The charging and communication system 117 may include a wireless power receiving system, such as the wireless power receiving system 125 depicted in FIG. 1. Power management circuitry 199 is configured to modulate power signals to transmit data or power. A receiver coil 170 is included in the wireless power receiving system 125 configured to receive power. The charging and communication system 117 may be controlled by the processors 112. In other examples, the charging and communication systems 117 may alternatively include power management circuitry 199 configured to transmit and/or receive data according to Bluetooth standard or other suitable standard, etc.

The charging and communication system 117 may enable wireless network connections, wireless ad hoc connections, and/or wired connections. The communication systems may be configured to support communication via cellular, LTE, 4G, 5G, WiFi, GPS, and other networked architectures. The charging and communication system 117 may be configured to support Bluetooth®, Bluetooth LE, near field communication (NFC) standards, Qi standards, and non-networked wireless arrangements. The charging and communication systems 117 may support wired connections such as a USB, micro USB, USB type C or other connector, for example to receive data and/or power from a laptop, tablet, smartphone or other device.

The charging and communication system 117 may each include one or more energy storages, such as energy storages 119 configured to receive and store power generated from the wireless power receiving system 125. In one example, the energy storage 119 may be a battery 520 of FIG. 5.

Although not shown, the watch body 145 may also include other additional components. For example, the watch body 145 may include a position determination module, which may include a GPS chipset or other positioning system components. Information from the sensors and/or from data received or determined from remote devices, such as wireless base stations or wireless access points, can be employed by the position determination module to calculate or otherwise estimate the physical location of the watch body 145 and/or watch band 130. As another example, the watch body 145 may include one or more internal clocks. The internal clocks may provide timing information, which can be used for time measurement for apps and other programs run by the computing devices, and basic operations by the computing devices, sensors, inputs/outputs, GPS, communication system, etc.

It is noted although the components shown in FIG. 2 is included in the watch body 145, it is noted that the one or more components of FIG. 2 may also be implemented or configured in other places of the smartwatch 100, such as the watch band 130.

Figure 3:
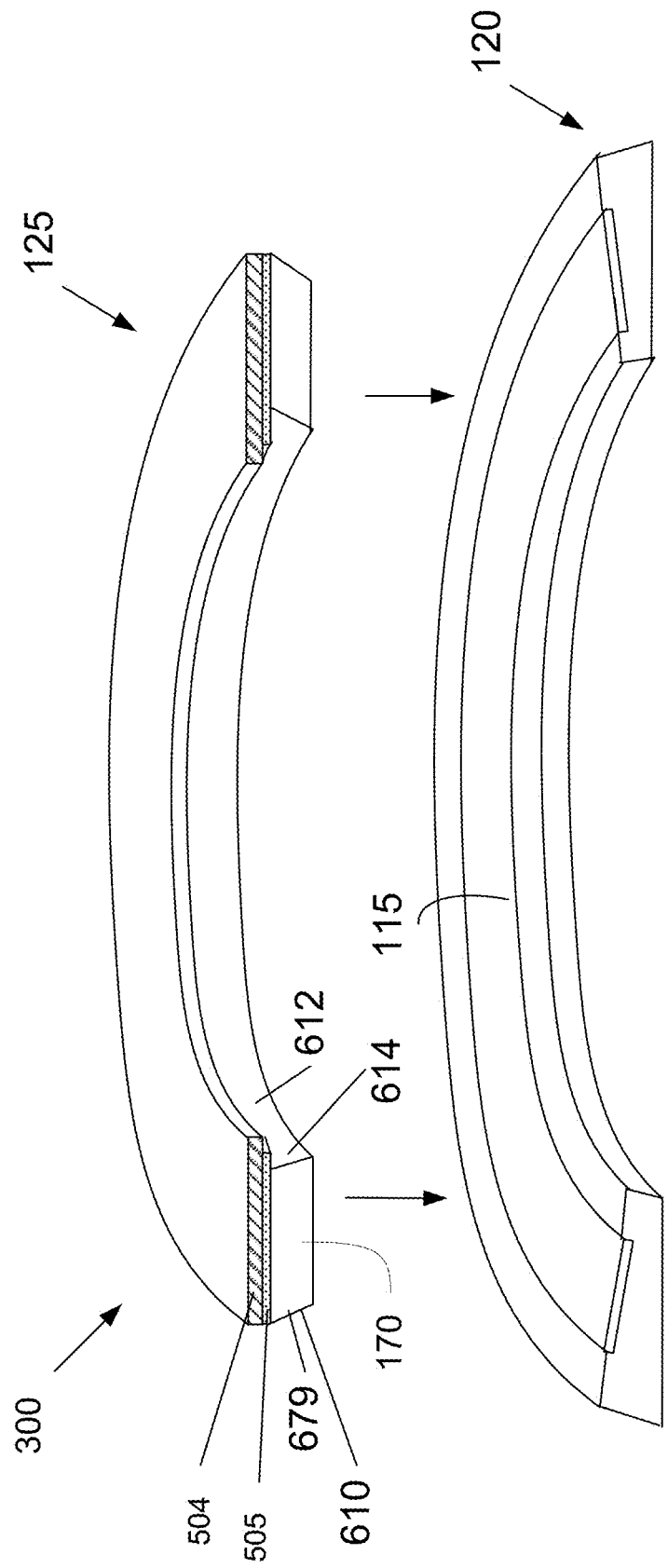
FIG. 3 depict a cross sectional view of a wireless power receiving system and a wireless charging device in accordance with aspects of the disclosure.

FIG. 3 depicts a cross sectional view of the wireless power transfer system 300 including the wireless power receiving system 125 and the wireless charging device 120. The wireless power receiving system 125 may be positioned and/or rested on the wireless charging device 120 with minimum gap and with good alignment therebetween to enhance charging efficiency. A bottom cover of the smartwatch 100 is omitted in this example for ease of illustration and explanation. The profile of the receiver coil 170 of the wireless power receiving system 125 is configured to substantially mate with the profile of a transmitter coil 115 disposed in a charging base. The transmitter coil 115 and the receiver coil 170 may each have a complementary conical shape. The conical shape of the receiver coil 170, for example with inner 612 and outer walls 679 each having the sloped surfaces 614, 610, provides a good mating surface with the transmitter coil 115.

Figure 4:
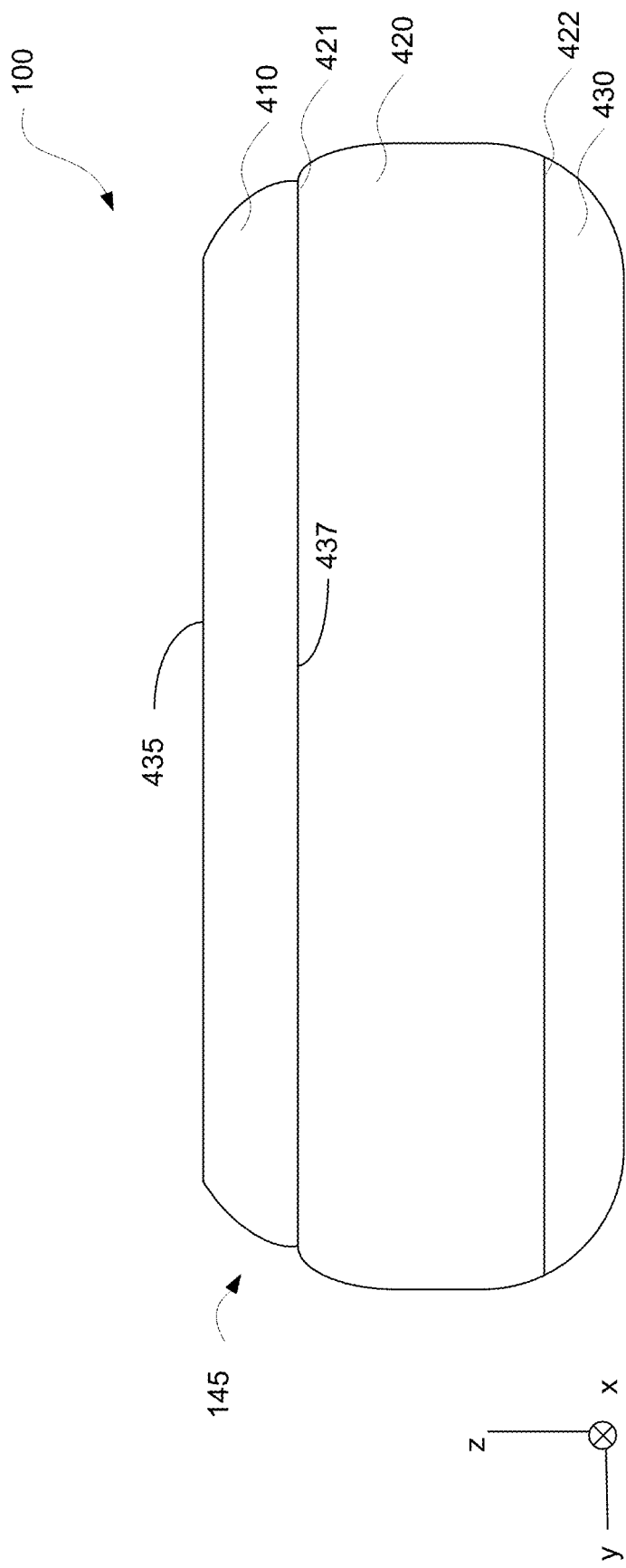
FIG. 4 depicts a sideview of an example smartwatch in accordance with aspects of the disclosure.

FIG. 4 depicts a sideview of an exterior of the smartwatch 100 having a wireless power receiving system. For ease of illustration, the watch band 130 or other connection mechanism is omitted for clarity. As depicted in FIG. 4, the smartwatch 100 includes a watch body 145 having a top cover 410, a housing 420, and a bottom cover 430. The top cover 410 may enable viewing of and interaction with a display. For example, the display may be a screen or a touch screen, and the cover may be glass or other suitable material. The top cover 410 has a first surface 435, and a second surface 437 opposite the first surface 435. The housing 420 has a first side 421 attached to the top cover 410, along the second surface 422 thereof, to provide support and protection to various electronic and/or mechanical components of the smartwatch 100. For example, as shown in the cross-section view of FIG. 5, the various electronic and/or mechanical components inside the housing 420 may include the wireless power receiving system 125. The housing 420 may be made of any of a number of dielectric materials. For example, the dielectric material may be a glass (such as corning, NEG) or a ceramic material (such as zirconia or alumina) According to one example, the housing 420 may have a thickness at a range from 0.5 mm to 1 mm for mechanical strength and durability.

A bottom cover 430 is attached to a second surface 422 of the housing 420. In one example, the bottom cover 430 is removably attached to the housing 420. The bottom cover 430 may be made of a non-metallic material, such as ceramic, glass, plastic or combinations thereof, to provide further insulation between the various electronic components of the smartwatch 100 and the wearer's skin. As such, the bottom cover 430 may reduce body effects such as detuning, attenuation, and shadowing of the wireless power receiving system 125 due to the wearer's skin. Alternatively, the bottom cover 430 may be made of a metallic material.

As depicted in the cross-sectional view in FIG. 5, the housing 420 along with the bottom cover 430 define an interior volume 502 that allows multiple electronic components to be disposed therein. In one example, a printed circuit board (PCB) 550 is disposed in the interior volume 502. A haptic motor 521, a battery 520 or other electronic components, such as a speaker, a microphone, or sensors may also be disposed on a first surface 547 or in close proximity to the printed circuit board 550. One or more magnets 530 may be disposed on a second surface 531 of the printed circuit board (PCB) 550, or other suitable places in the interior volume 502. The magnets 530 are configured to exert aligning magnet force between the smartwatch 100 and the wireless charging device 120. A sensor plate 504, on which a heart rate sensor 507 is disposed, is disposed on the magnets 530. The wireless power receiving system 125 is disposed on the sensor plate 504. The wireless power receiving system 125 and the sensor plate 504 may both be in an annular configuration to enhance the stacking of the wireless power receiving system 125 to the sensor plate 504.

In one example, the wireless power receiving system 125 includes a receiver coil 170 disposed on a shielding 505. An adhesive material 540 may be utilized between the receiver coil 170 and the shielding 505 to enhance the adhesion therebetween. Details of the wireless power receiving system 125 will be described below with reference to FIGS. 7A-7C. In one example, the shielding 505 may be fabricated from a material that may modify or redirect the transfer of electromagnetic energy applied to the receiver coil 170. Thus, the receiver coil 170 may receive more or most of the electromagnetic energy to improve charging efficiency. The shielding 505 may additionally or alternatively be configured to shield the electronic components disposed in the smartwatch 100, such as the battery 520, the haptic motor 521 or the like, from electromagnetic energy so as to prevent the electronic components from damage when charging. The shielding 505 may prevent the electromagnetic energy directed toward the smartwatch 100 from heating or otherwise affecting the electronic components and redirect the electromagnetic energy in a direction away from the electronic components.

In one example, the shielding 505 may help redirect magnetic field toward the receiver coil 170 to increase efficiency of wireless power transfer and to mitigate stray field from propagating to disturb other electrical components within the electronic device. In one example, the shielding 505 may be fabricated from doped dielectric material, a metallic and/or magnetic material having a relatively high magnetic permeability, or other suitable composite materials that may efficiently shield, alter or affect the transmitting path of the electromagnetic energy. Suitable material that may be utilized to fabricate the shielding 505 include nanocrystalline, polycrystalline or amorphous material of magnetic material, such as iron, iron silicate, iron-cobalt, manganese-zinc, nickel, or nickel-zinc, or doped materials including plastic, glass, or other composite materials. In one example, the dopant may be a metal material.

In one example, the shielding 505 has a dimension/width slightly larger than the dimension/width of the receiver coil 170, thus defining a bottom exposed surface 599 without in direct contact with the receiver coil 170 and/or the adhesive layer adhesive layer 540. The slightly larger dimension of the shielding 505 covers substantially the overall structure of the receiver coil 170 to redirect the magnetic field generated during charging toward the receiver coil 170 and also prevent the magnetic field to damage the nearby electronic components. In one example, the shielding 505 covers an entire top surface of the receiver coil 170 and/or the adhesive layer adhesive layer 540. The structure of the receiver coil 170 configured to be shielded under the shielding 505.

Figure 7A:
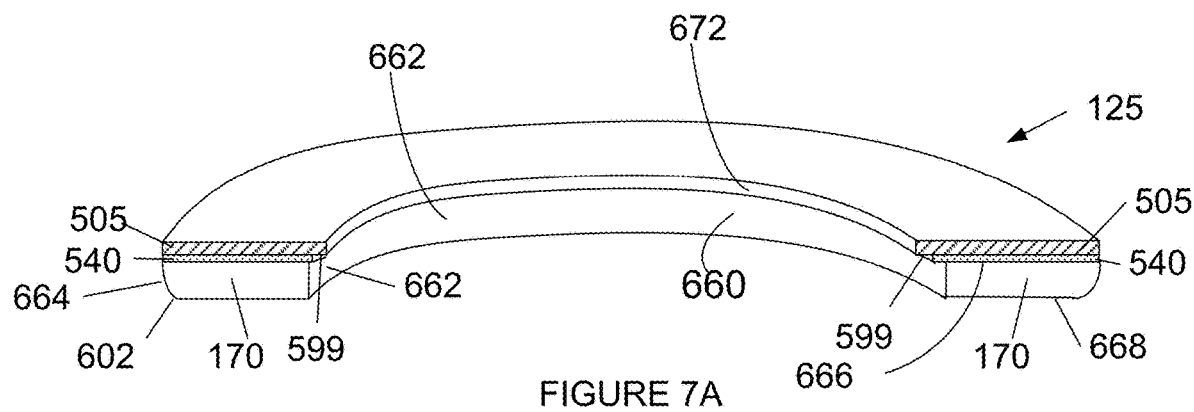
FIG. 7A-7D depict cross sectional views of different examples of wireless power receiving systems in accordance with aspects of the disclosure.

FIG. 6A-6B depict top views of receiver coils 170, 650 with different profiles. In the example depicted in FIG. 6A, the receiver coil 170 may be in an annular shape 652. In one example, the receiver coil 170 may be configured as a ring that has a center opening 658 defined in a coil body 660. The coil body 660 has a body width 669 between about 3.5 mm and about 4.0 mm, such as between about 3.7 mm and about 3.9 mm. The coil body 660 has an inner wall 662 and an outer wall 664 connected by a top surface 666 and a bottom surface 668 (as shown in FIG. 7A) of the coil body 660. The inner wall 662 of the coil body 660 defines an inner diameter 670 of the center opening 658. The inner diameter 670 of the opening 658 is configured in a predetermined dimensional range to accommodate placement of the heart rate sensor 505 or other sensors therein (as shown in FIG. 5). In one example, the inner diameter 670 may be in a range between about 15 mm and about 16 mm, such as between about 15.4 mm and about 15.6 mm.

In the example depicted in FIG. 6B, the receiver coil 650 may also be a ring-like structure of the coil body 676 having a substantially annular portion 656 and a linear side portion 654. The linear side portion 654 defines a rectangular portion of the coil body 676 that is in connection with the annular portion 656 of the coil body 676. The length 655 of the linear side portion 654 may be in any suitable range that may facilitate implementation of the receiver coil 650 with the shield 505 in the wireless power receiving system 125. The linear side portion 654 and the annular portion 656 in combination form a unitary and/or integral piece of the receiver coil 650. The linear side portion 654 has a width 681 substantially similar to or the same as the width 680 of the annular portion 656.

Similarly, the receiver coil 650 has a center opening 674 defined by an inner wall 683 of the side portion 654 and the annular portion 656. The center opening 675 defines an inner diameter 672 in the annular portion 656 that may accommodate placement of the heart rate sensor 505 or other sensors therein (as shown in FIG. 5).

Figure 7B:
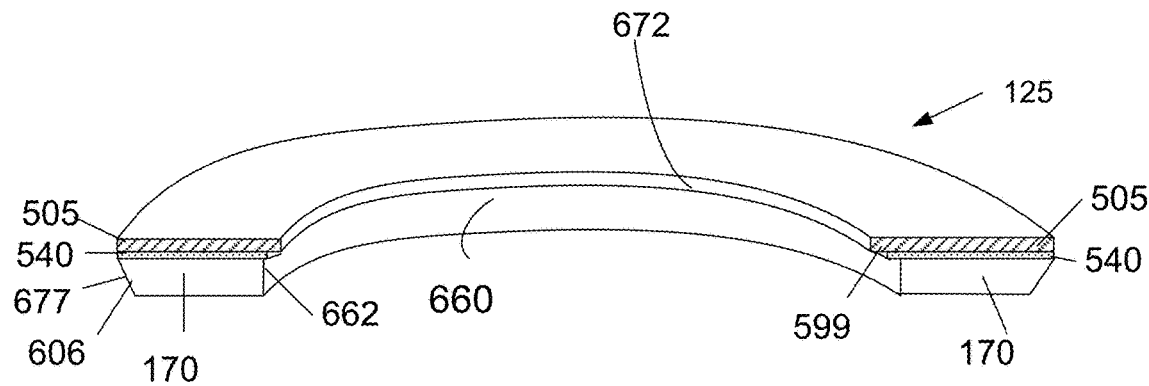
Figure 7C:
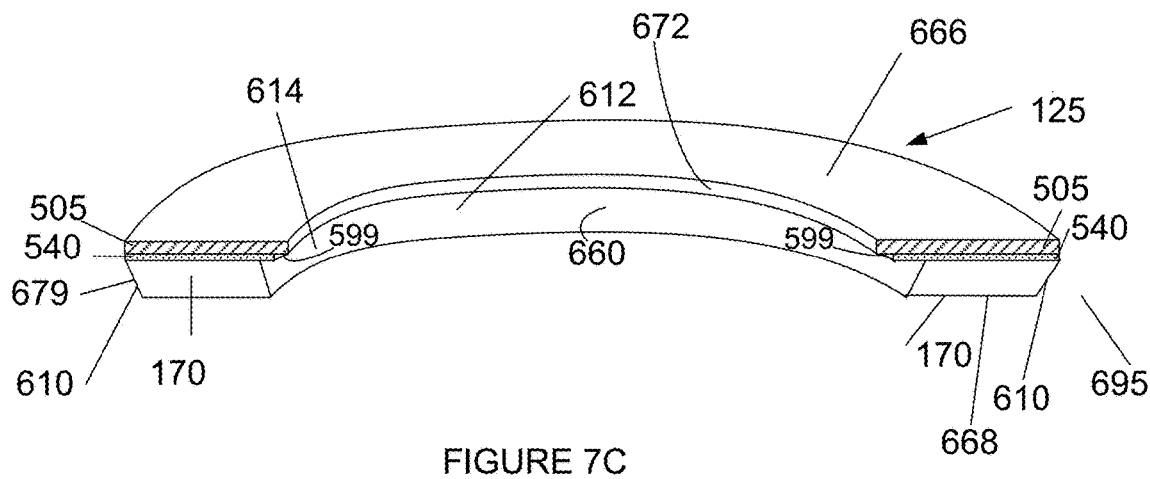

FIGS. 7A-7C depict cross sectional views of the wireless power receiving system 125 with different profile configurations of the receiver coil 170. In one example, the receiver coil 170 may be several windings of an electrical conductor, such as copper. In another example, an individual winding may be composed of several independent strands of wire. In some examples, the windings may be provided in a substantially annular shape, with one or more layers of windings. As described above, the windings may be provided in an annular configuration, as the example depicted in FIG. 6A. Alternatively, the windings may be provided having a first portion substantially in an annular shape and a second portion substantially in a rectangular shape, similar to the example in FIG. 6B, from the top view.

In some examples, the top surface 666 may be attached to the shield 505 through the adhesive layer 540 while the bottom surface 668 and/or side surface follows the profile and/or contour of the bottom cover 430. Accordingly, the receiver coil 170 may have different cross-sectional profiles, such as different profiles of the bottom or side surfaces, as shown in FIGS. 7A-7C. The different profiles may accommodate different profiles from an interior surface of the bottom cover 430 of the watch body 145. For example, in the example depicted in FIG. 7A, the receiver coil 170 may have a curved bottom sidewall 602 that substantially follows the contour of the bottom cover 430. Closely following the contour may minimize a gap, if any, between the coil body 660 and the bottom cover 430 of the smartwatch 100. By minimizing the gap between the coil body 660 and the bottom cover 430, a distance of the receiver coil 170 to the transmitter coil 115 from the wireless charging device 120 may also be reduced, thereby enhancing the charging efficiency.

In the example depicted in FIG. 7A, the inner wall 662 of the coil body 660 may be substantially vertically straight while the outer wall 664 may have the substantially curved bottom sidewall 602 when the interior surface of the bottom cover 430 is also curved.

In the example depicted in FIG. 7B, similar to the example depicted in FIG. 7A, the inner wall 662 of the coil body 660 may be vertically straight while an outer wall 606 of the coil body 660 may have a sloped or angled surface 677. The degree of the slope may be determined by the profile of the interior surface of the bottom cover 430. Thus, the sloped or angled surface 677 of the coil body 660, such as the layers of the windings defining the coil body 660, contours to the respective interior surface of the bottom cover 430.

In the example depicted in FIG. 7C, unlike the vertical straight inner walls in the example of FIGS. 7A and 7B, the inner wall 612 of the coil body 660 may have an angled surface or sloped surface 614, which may or may not be parallel to an sloped or angled surface 610 of the outer wall 679 of the coil body 660. In the example wherein the sloped or angled surface 610 of the outer wall 679 is in parallel with the sloped or angled surface 614 of the inner wall 612, the coil body 660 may be substantially configured in conical shape.

Figure 7D:
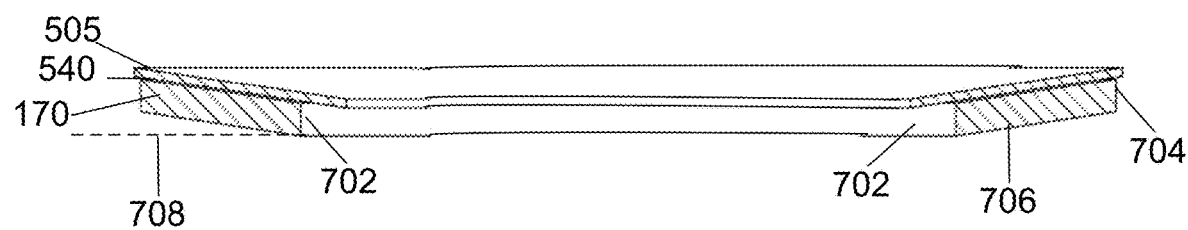

In the example depicted in FIG. 7D, the receiver coil 170 has an inner wall 702 and an outer wall 704 connected by a bottom surface 706. The receiver coil 170 is substantially conical in shape. The bottom surface 706 may be tilted or sloped relative to a horizontal plane 708. The tilted or sloped configuration of the bottom surface 706 may assist fitting the bottom surface 706 to the contour of an interior surface of the bottom cover 430 of the wearable device 100 with minimal gap therebetween.

In some examples, the top surface 666 and the bottom surface 668 may be similarly configured as the inner and the outer wall so that the top surface 666 and the bottom surface 668 may also be curved, tilted, or angled, such as a three-dimensional geometrical configuration.

It is noted that the inner wall 662, 612 of the receiver coil 170 does not laterally extend beyond an inner wall 672 of the shielding 505. For example, the inner wall 662 is vertically inward from the inner wall 672 of the shielding 505, thus defining the bottom exposed surface 599 free from contact with the receiver coil 170. The relatively larger in dimension/width of the shielding 505 covers substantially the overall structure of the receiver coil 170 to improved charging efficiency.

FIGS. 8A-8C depict different examples of the shielding 802, 804, 806 that may be utilized in the wireless power receiving system 125. Similar to the shielding 504 described above, the shielding 802, 804, 806 may be substantially annular in shape. In one example, the shielding 802, 804, 806 is substantially ring shaped having a center opening defined in a shield body.

In the example depicted in FIGS. 8A-8C, a cut-out portion, such as a slot, is formed in the shielding 802, 804, 806 to facilitate implementation and attachment of the shielding 802, 804, 806 to the receiver coil 170. The cut-out portion 850, 860, 872a, 872b of the shielding 802, 804, 806 may result in a better fit to the top surface 666 of the receiver coil 170 through the adhesive layer 540. For example, the cut-out portion 850, 860, 872a, 872b of the shielding 802, 804, 806 may provide a good fitting surface to the top surface 666 of the receiver coil 170 and/or to the adhesive layer 540 when the top surface 666 of the receiver coil 170 has a three-dimensional geometry, such as an angled, tilted, or sloped surface. Thus, unevenness or wrinkles at the interface between the shielding 802, 804, 806 and the receiver coil 170 may be reduced or eliminated. The close fitting interface may also minimize the gap between the shielding 802, 804, 806 and an underside of the receiver coil 170. Furthermore, the cut-out portion 850, 860, 872a, 872b of the shielding 802, 804, 806 may also help mitigate elastic stress formed therebetween.

In the example depicted in FIG. 8A, a cut-out portion 850 with substantially straight sidewalls 852 may be formed in a shield body 854 of the shielding 802. In the example depicted in FIG. 8B, a cut-out portion 860 with substantially tilted or sloped sidewalls 862 may be formed in a shield body 864 of the shielding 804. In the example depicted in FIG. 8C, one or more cut-out portions 872a, 872b may be formed in an inner wall 874 defining the center opening 876 in the shielding 806. Although four cut-out portions 872a, 872b are formed in the center opening 876 of the shielding 806, it is noted that the cut-out portions formed therein may be in any number as needed.

FIGS. 9A-9E depict different examples of the shielding 902, 904, 906 that may be utilized in the wireless power receiving system 125. Similar to the shielding 802, 804, 806 described above, the shielding 902, 904, 906, 908, 910 may have an annular portion 954, 964, 974, 984, 994 substantially annular in shape connected to a linear side portion 958, 968, 978, 988, 998 substantially rectangular in shape, similar to the configuration and/or profile of the receiving coil 650 of FIG. 6B described above.

In the example depicted in FIG. 9A, a cut-out portion 950, such as a slot, having straight sidewalls 952 is formed in the linear side portion 958 of the shielding 902. Although the cut-out portion 950 is formed in the linear side portion 958, it is noted that the cut-out portion may be formed in any suitable position in the shielding 902 including the annular portion 954.

In the example depicted in FIG. 9B, a cut-out portion 960, such as a slot, having tilted, angled, or sloped sidewalls 962 is formed in the linear side portion 958 of the shielding 902. Although the cut-out portion 960 is formed in the linear side portion 968, it is noted that the cut-out portion may be formed in any suitable position in the shielding 904 including the annular portion 964.

In the example depicted in FIG. 9C, one or more cut-out portions 972a, 972b may be formed in an inner wall 975 defining the center opening 976 in the shielding 906, either in the annular portion 974 or the side linear portion 978 or both. Although four cut-out portions 972a, 972b are formed in the center opening 976 of the shielding 906, it is noted that the cut-out portions formed therein may be in any number as needed.

Figure 9E:
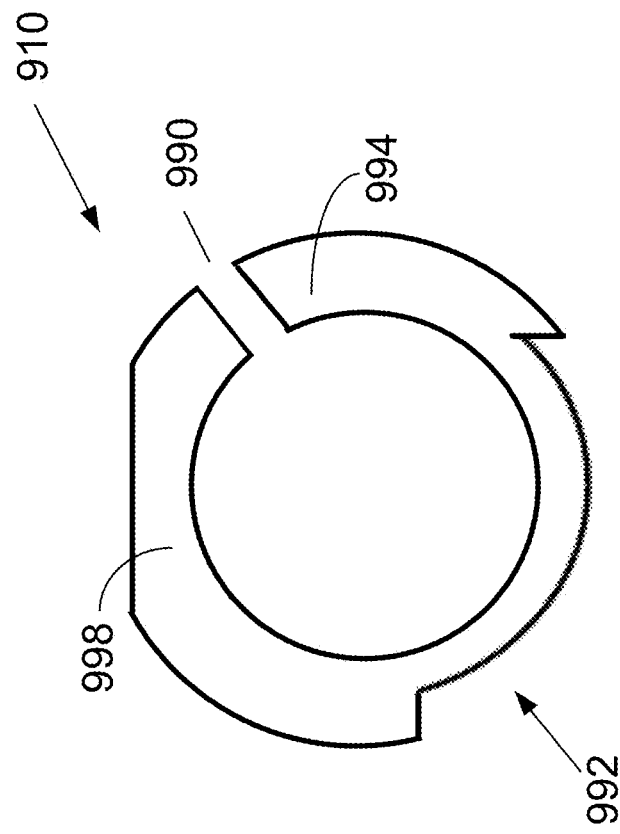
Figure 9D:
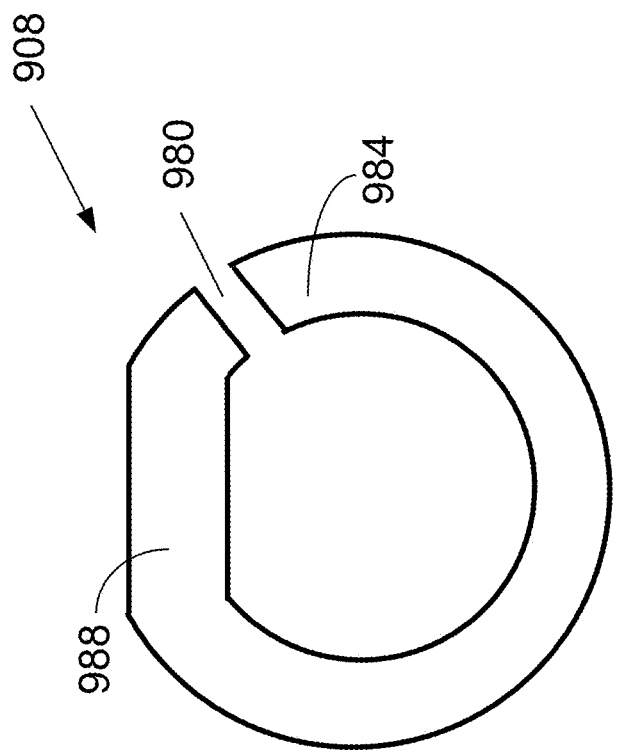

In the example depicted in FIG. 9D, a cut-out portion 980 is formed in the annular portion 984 near the linear side portion 988.

In the example depicted in FIG. 9E, in addition to a cut-out portion 990 formed in the annular portion 994 near the linear side portion 998, an additional cut-out portion 992, such as an arc-like structure, may be formed in the annular portion 984 of the shielding 910. The additional cut-out portion 992 may expose a portion of the receiver coil 170 disposed thereunder.

It is noted that cut-out portions 950, 960, 972a, 972b, 980, 990, may accommodate a wire lead to pass therethrough.

Figure 10:
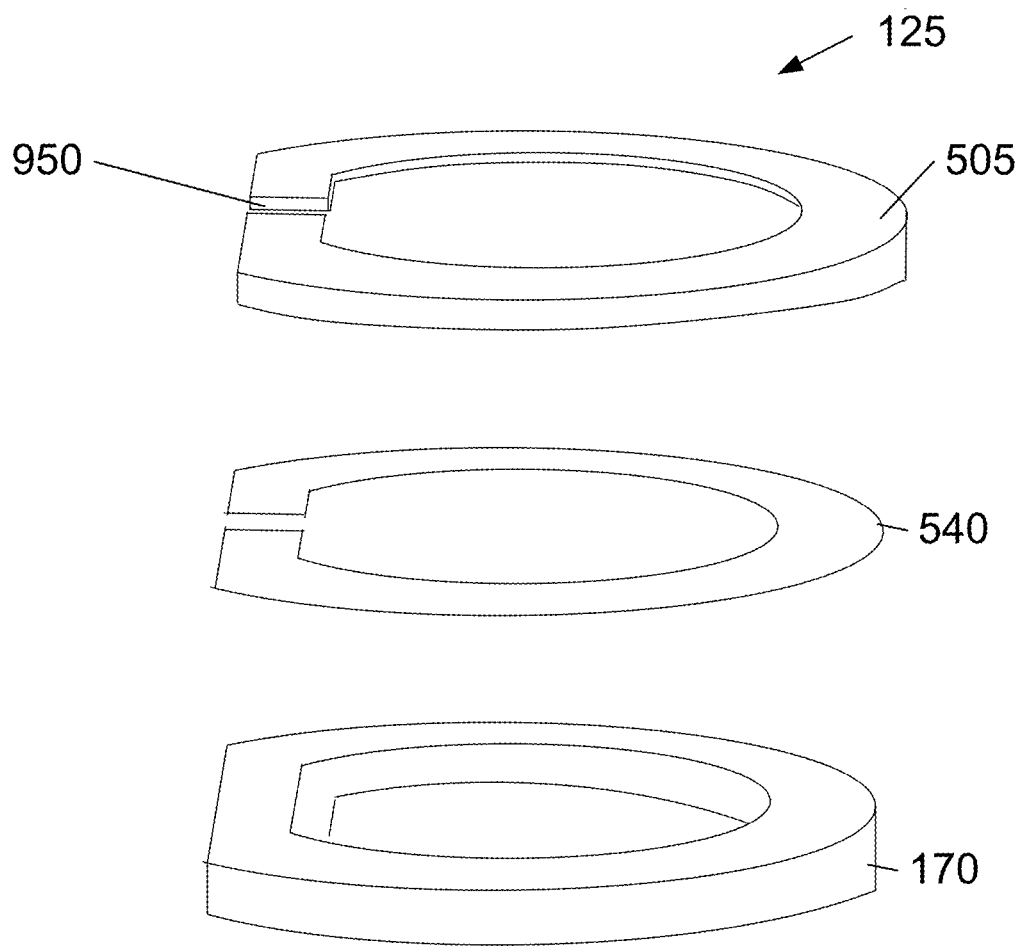
FIG. 10 depicts an exploded view of an example of a wireless power receiving system in accordance with aspects of the disclosure.

FIG. 10 depicts an exploded view of the wireless power receiving system 125 that includes the shielding 505, the adhesive layer 540 and the receiver coil 170. Although the example depicted in FIG. 10 has the shielding 505, the adhesive layer 540 and the receiver coil 170 each having an annular portion connected to a side linear portion, it is noted that the shielding 505, the adhesive layer 540 and the receiver coil 170 may be annular in shape, as described above with reference to FIG. 6A and FIGS. 8A-8C. During manufacturing, the shielding 505 is aligned and attached to the receiver coil 170 through the adhesive layer 540. As described above, the adhesive layer 540 may be a heat activated material. Thus, upon supplying of a thermal energy, the adhesive layer 540 may be softened and become adhesive to enhance the attachment and the adhesion between the receiver coil 170 and the shielding 505.

Figure 11:
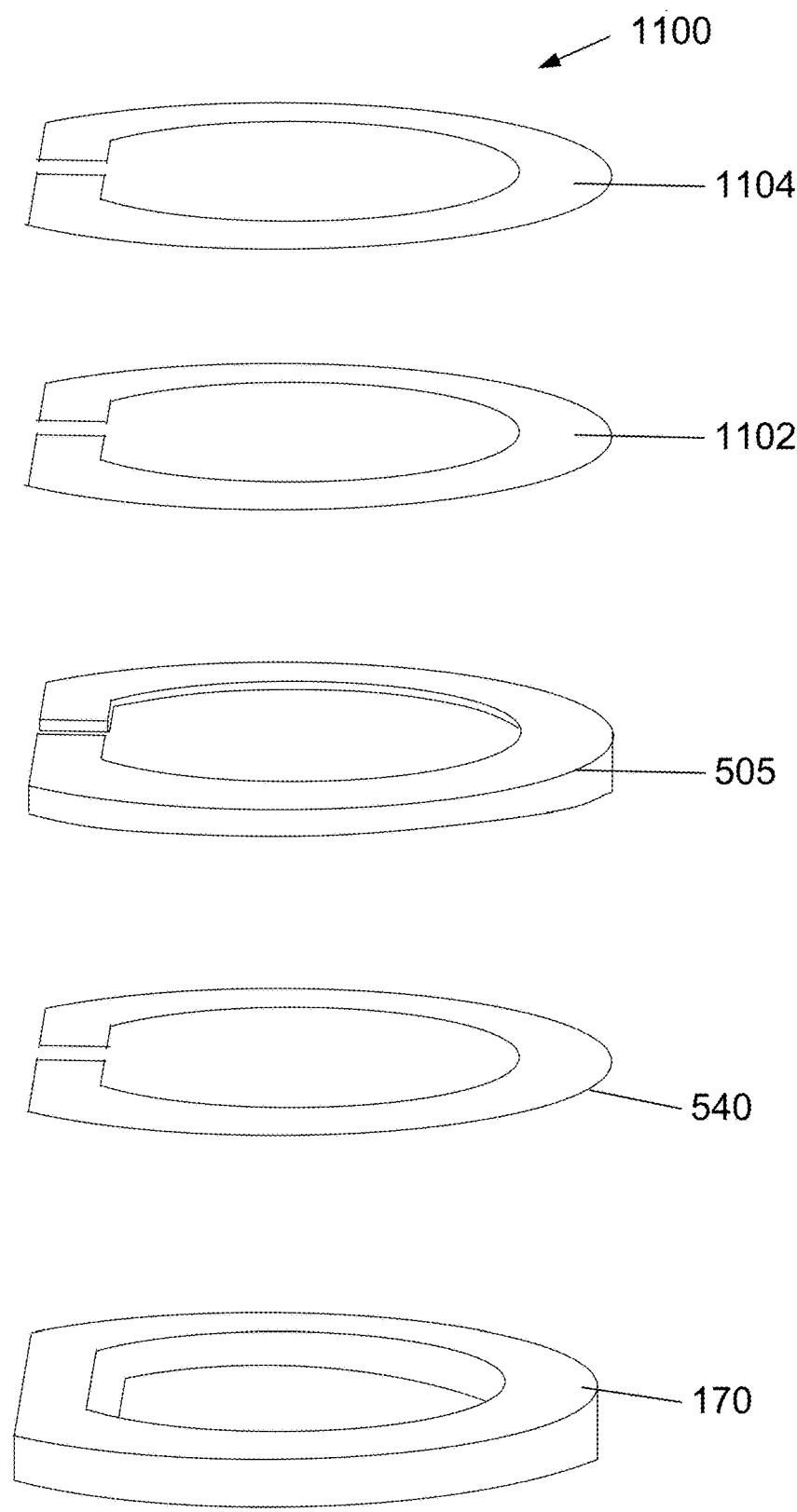
FIG. 11 depicts an exploded view of another example of a wireless power receiving system in accordance with aspects of the disclosure.

FIG. 11 depicts an exploded view of another example of a wireless power receiving system 1100 that may be utilized in the smartwatch 100. In addition to the shielding 505, the adhesive layer 540 and the receiver coil 170, a release film 1104 and an additional adhesive layer 1102 may be formed on the shielding 505. The additional adhesive layer 1102, similar to the adhesive layer 540, may be thermally activated to facilitate the attachment of the shielding 505 to the release film 1104. The release film 1104 may also be a film layer that may be peeled off when assembling to allow the additional adhesive layer 1102 to adhere the shielding 505, the adhesive layer 540 and the receiver coil 170 to a designated structure, such as the sensor plate 504 as depicted in FIG. 5.

Figure 12:
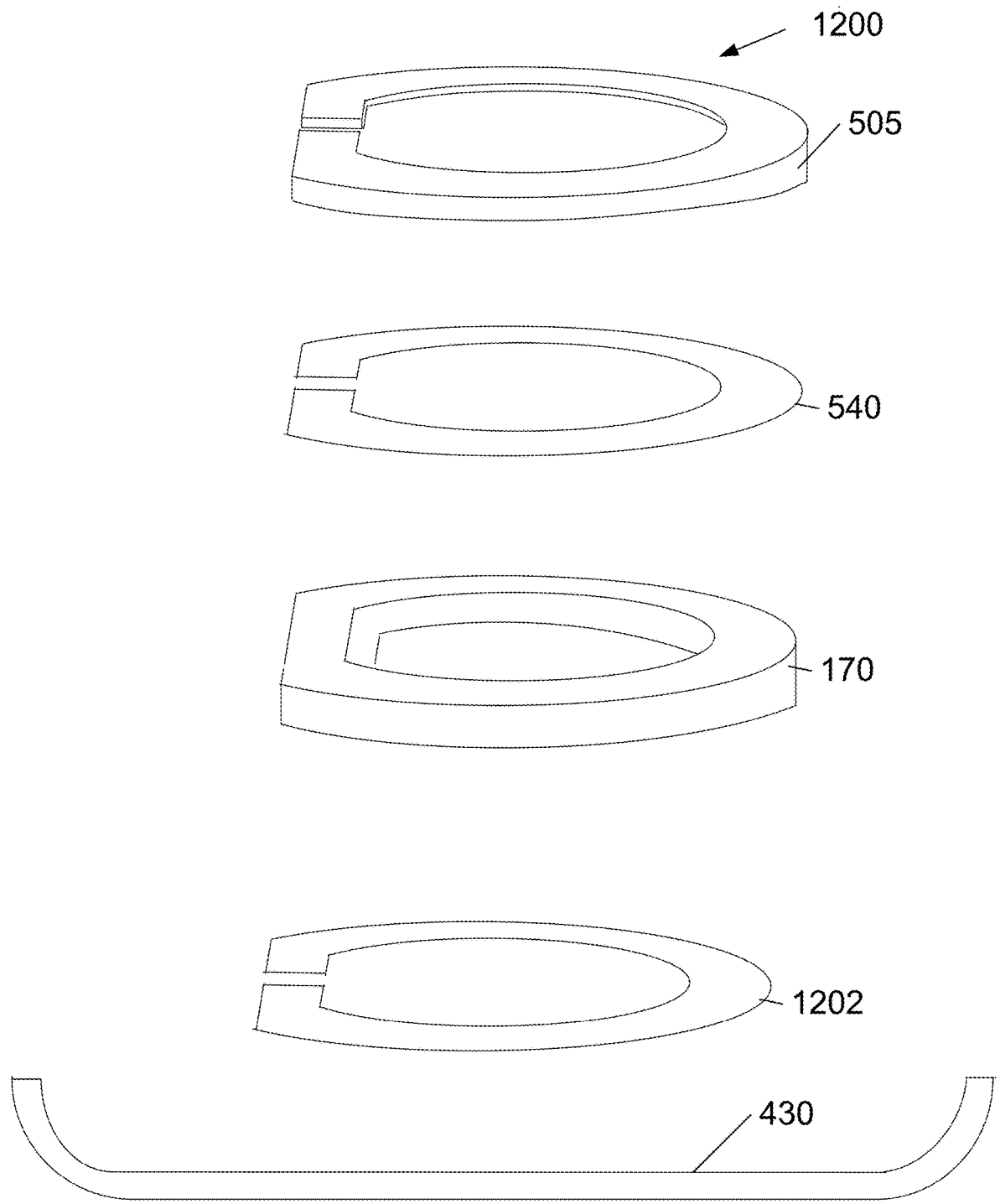
FIG. 12 depicts an exploded view of yet another example of a wireless power receiving system with a bottom cover of a wearable device in accordance with aspects of the disclosure.

FIG. 12 depicts an exploded view of yet another example of a wireless power receiving system 1200 that may be utilized in the smartwatch 100. In addition to the shielding 505, the adhesive layer 540 and the receiver coil 170, a bottom adhesive layer 1202, similar to the adhesive layer 540, is formed on the bottom surface of the receiver coil 170. The bottom adhesive layer 1202 may be similar to the adhesive layer 540 that may be thermally activated to facilitate the attachment of the receiver coil 170 to the bottom cover 430 of the smartwatch 100.

FIGS. 13A-13B depict a perspective view of the wireless charging device 120 with or without the transmitter coil 115 placed therein. In the example depicted in FIG. 13A, the transmitter coil 115 is sized to be positioned in a channel 1306 (shown in FIG. 13B) defined in a charging base 1350 in the wireless charging device 120. The transmitter coil 115 is removable from the charging base 1350. Similar to the receiver coil 170 described above, the transmitter coil 115 may include several windings of an electrical conductor, such as copper. In some examples, an individual winding may be composed of several independent strands of wire. The windings may be provided in a substantially annular shape, with one or more layers of windings. The layers of the windings define the coil body of the transmitter coil 115.

The charging base 1350 may have an annular body 1355 having a center opening 1308 defined therein. The annular body 1355 includes an outer flange 1302 and an inner flange 1304 connected by a supporting bottom 1357. The outer flange 1302, the inner flange 1304 and the supporting bottom 1357 in combination define the channel 1306 therein that allows the transmitter coil 115 to be disposed therein. A slot 1320 may be formed on the outer flange 1302 to facilitate removal or placement of the transmitter coil 115 into the channel 1306.

FIG. 13C depicts a cross sectional view of the wireless charging device 120 along the cutting line A-A as depicted in FIG. 13A. In one example, the channel 1306 defined between the inner flange 1304 and the outer flange 1302 may have a sloped surface 1312, such as a tilt surface or an angled surface, or other surface configuration to receive the transmitter coil 115 that is configured to mate with the shape of the receiver coil 170, or the profile of the bottom cover 430 of the smart watch 100. In other words, the transmitter coil 115 may be configured to have a complementary shape to the shape from the receiver coil 170, or the profile of the bottom cover 430, to enhance the charging efficiency therebetween. In the example depicted in FIG. 13C, the sloped surface 1312 may have an angle $\beta$ in a range between about 5 degrees and about 15 degrees, such as between about 9 degrees and about 11 degrees, relative to a horizontal plane 1311. In one example, the transmitter coil 115 may be in conical shape, similar to the conical shape of the receiver coil 170 of FIG. 7C, so as to fit the profile defined from the receiver coil 170. In one example, the sloped surface 1312 of the channel 1306 is configured to mate with a conical shape of the transmitter coil 115.

Furthermore, a height difference 1322 between heights of the outer flange 1302 and the inner flange 1304 is also defined to facilitate formation of the sloped surface 1312. In one example, the height difference 1322 is in a range between about 0.5 mm and about 0.9 mm, such as between about 0.60 mm and about 0.62 mm, with the outer flange 1302 having a height greater than a height of the inner flange 1304. It is noted that the structure of the charging base 1350 may be in any configurations to provide a surface profile that provides a good profile fit to the transmitter coil 115 so that the transmitter coil 115 may also follow and/or fit the profile of the bottom cover 430 and/or the receiver coil 170 so as to minimize the gap between the transmitter coil 115 and the receiver coil 170.

In one example, the transmitter coil 115 may be coupled to a processor 1351 in the charging base 1350 to control the transmitter coil 115. For example, the processor 1352 may control and provide an AC power signal or a DC power signal to the transmitter coil 115 to induce a particular voltage/current within the receiver coil 170 through the transmitter coil 115. In some examples, the processor 1351 may change the operating frequency of the power signal.

The present disclosure provides for a wireless power transfer system having a wireless power receiving system and a wireless charging device. A receiver coil from the wireless power receiving system has a profile that follows a contour of a bottom cover of the wearable device while a transmitter coil 115 from the wireless charging device has a complementary profile that mates with the profile defined by the receiver coil. Accordingly, a gap between the receiver coil to the bottom cover of the wearable device is minimized so that a distance from the receiver coil to the transmitter coil from wireless charging device may also be reduced to enhance a charging coupling coefficient and charging efficiency.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A wireless power receiving system, comprising:
    a shielding with a leading end and a trailing end, wherein a cut-out portion separates the leading end from the trailing end; and
    a receiver coil attached to the shielding, wherein the receiver coil further comprises:
        an inner wall and an outer wall connected by a lateral top surface of the receiver coil, wherein the inner wall defines a center opening in the receiver coil, wherein the inner wall of the receiver coil is sloped resulting in a conical in shape of the receiver coil,
    wherein the shielding at least partially extends across the lateral top surface of the receiver coil, and wherein the cut-out portion of the shielding exposes a portion of the lateral top surface of the receiver coil.

2. The wireless power receiving system of claim 1, further comprising:
    an adhesive layer disposed between the shielding and the receiver coil.

3. The wireless power receiving system of claim 1, wherein the receiver coil has a side linear portion connected to an annular portion.

4. The wireless power receiving system of claim 1, wherein the receiver coil comprises several windings of an electrical conductor.

5. The wireless power receiving system of claim 1, further comprising:
    a release film; and
    an adhesive layer disposed between the release film and the shielding.

6. The wireless power receiving system of claim 1, wherein the shielding has a side linear portion connected to an annular portion.

7. The wireless power receiving system of claim 6, wherein the cut-out portion is formed in the side linear portion.

8. The wireless power receiving system of claim 1, further comprising a second cut-out portion formed at an inner wall of the shielding.

9. The wireless power receiving system of claim 1, wherein a width of the shielding is wider than a width of the receiver coil.

\* \* \* \* \*